Aug. 30, 1949.　　　A. R. SCHULZE　　　2,480,512
RESILIENT WHEEL
Filed Feb. 5, 1946　　　　　　　　　　　　　　2 Sheets-Sheet 1

INVENTOR:
ARTHUR R. SCHULZE,
BY: Donald G. Dalton
HIS ATTORNEY.

Aug. 30, 1949.  A. R. SCHULZE  2,480,512
RESILIENT WHEEL
Filed Feb. 5, 1946  2 Sheets-Sheet 2
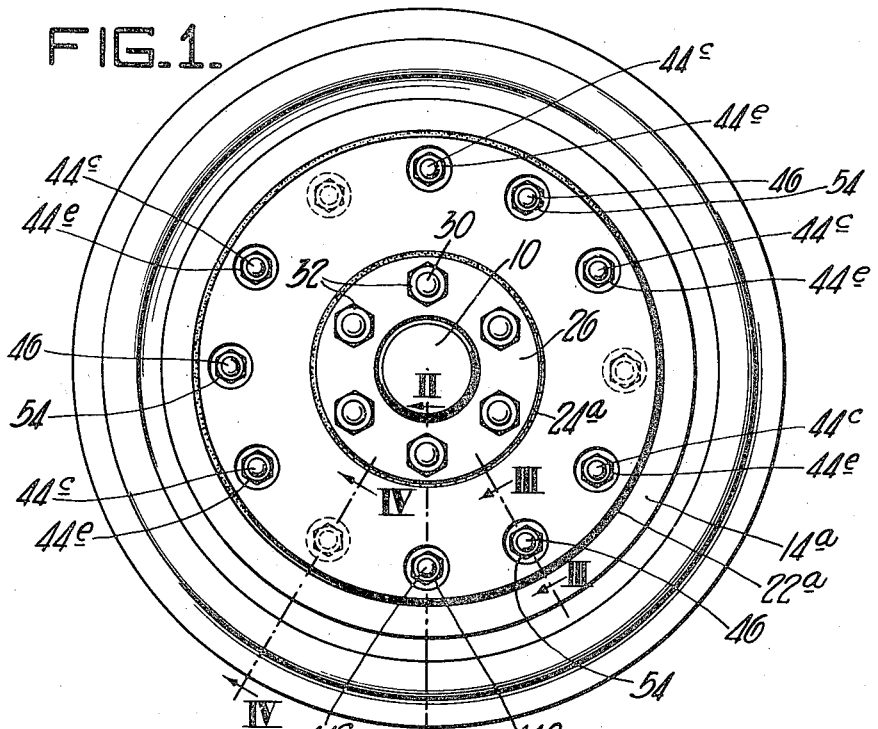
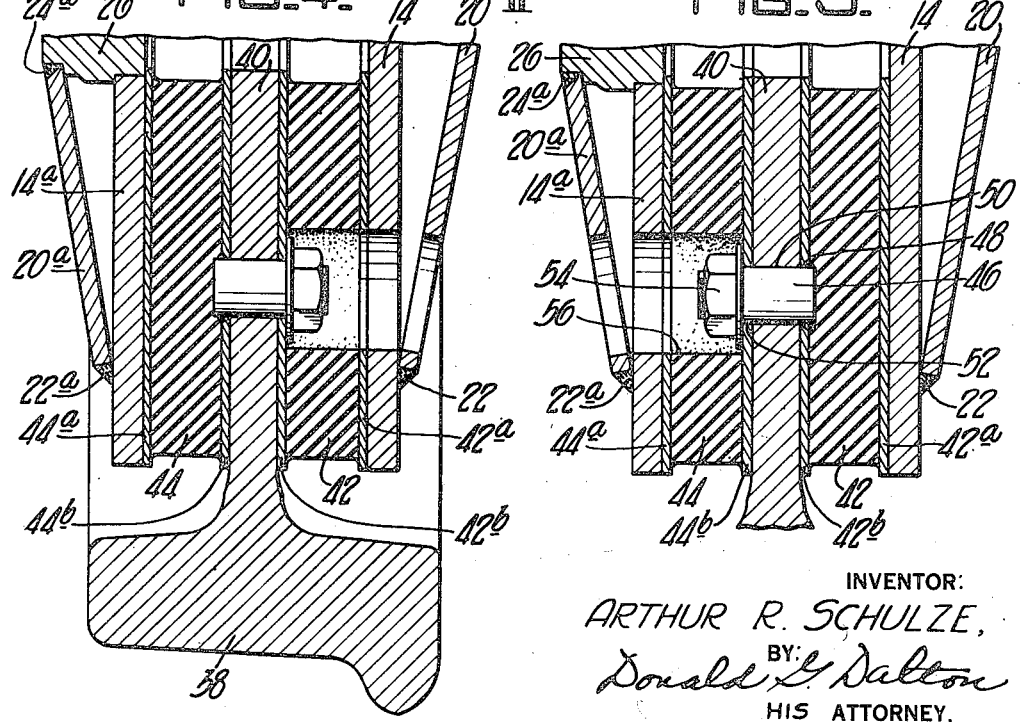
INVENTOR:
ARTHUR R. SCHULZE,
BY: Donald G. Dalton
HIS ATTORNEY.

Patented Aug. 30, 1949

2,480,512

UNITED STATES PATENT OFFICE 2,480,512

RESILIENT WHEEL

Arthur R. Schulze, Johnstown, Pa., assignor to Carnegie-Illinois Steel Corporation, a corporation of New Jersey Application February 5, 1946, Serial No. 645,500

2 Claims. (Cl. 295—11)

The present invention relates to detailed features of construction and arrangement of the component parts of a resilient wheel.

One object of the invention is to provide improved means for anchoring rubber or equivalent cushion elements to a car wheel structure. While not limited thereto, the present invention is peculiarly well suited for use in connection with the type of wheel shown in Steward Patent No. 2,046,216, dated June 30, 1936, and owned by the assignee of the present invention.

For a complete understanding of the present invention, reference should be made to the following detailed description, the accompanying drawings, and the appended claims.

In the drawings:

Figure 1 is a face view of a wheel embodying the invention.

Figures 3 and 4 are similar radial sections on lines III—III and IV—IV of Figure 1.

Figure 2:
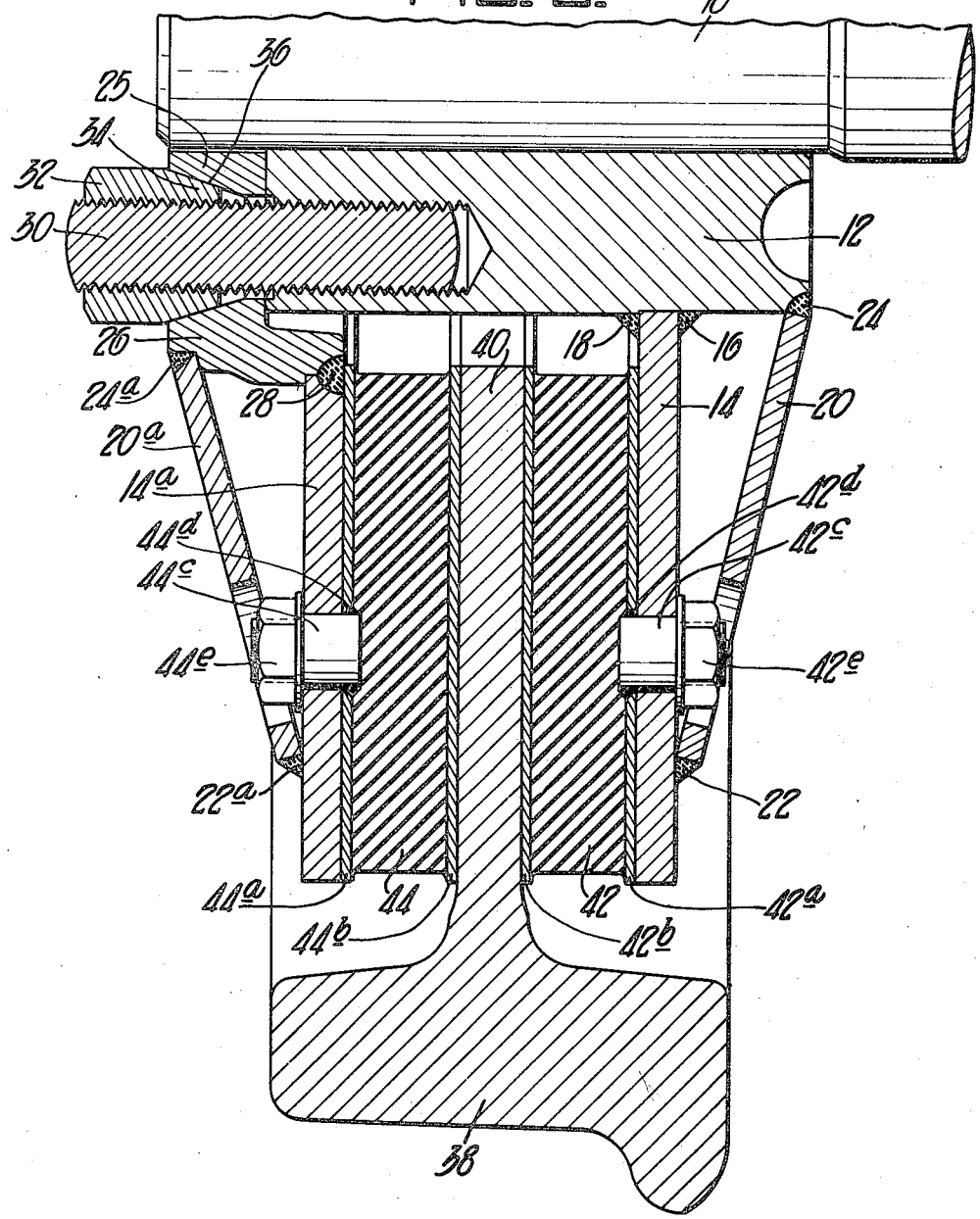
Figure 2 is a radial transverse section on line II—II of Figure 1.

Referring in detail to the drawings, reference numeral 10 represents a conventional form of street railway car axle having a hub 12 of a car wheel secured thereto in any suitable manner. Adjacent the inner end of the hub is a circular plate 14; herein referred to as an inner cheek element, this element being secured by welded seams 16 and 18 as shown. A frusto-conical reinforcing plate 20 is welded at 22 near the outer portion of the cheek element and is welded by a circular seam 24 to the hub 12.

Adjacent the outer end of the hub is a circular plate 14$^a$ which is braced by a frusto-conical plate 20$^a$, the member 14$^a$ being herein referred to as the outer cheek element. The brace 20$^a$ is welded to the cheek element 14$^a$ by a seam weld 22$^a$ at its outer edge and its inner portion is secured by a seam weld 24$^a$ to a sleeve 26 which is welded at 28 to the inner edge of cheek element 14$^a$. The end wall 25 of the sleeve 26 is pierced by a plurality of screw studs 30 threaded into the outer end of the hub 12, said studs carrying nuts 32 having tapered ends 34 engaging tapered sockets 36 formed in the outer end wall 25 of the sleeve 26.

A wheel rim 38 of high carbon steel is provided with an integral radial web 40 of similar steel. Located on opposite sides of the web 40, cushions 42 and 44 of rubber, synthetic rubber, or its equivalents, are provided. It is broadly old in the art to use rubber cushions or the like in this environment, as shown, for example, in the above mentioned Steward patent. The present invention is directed specifically to the means for incorporating the cushions 42 and 44 in the wheel structure. These wheel cushions are frequently referred to by those skilled in the art as rubber sandwiches. Such rubber sandwiches usually comprise a disk of rubber flanked on its opposite faces by steel face plates which may be bonded thereto. As shown in the drawings, the rubber sandwich or cushion 42 includes outer metallic face plates 42$^a$ and inner metallic face plates 42$^b$. The cushion or sandwich 44 similarly includes outer metallic face plates 44$^a$ and inner face plates 44$^b$.

The face plate 42$^a$, as shown in Figures 1 and 2, is provided with a plurality of stud bolts 42$^c$ which pass through suitable openings formed in the face plates, and are integrated therewith by welded seams 42$^d$. At their outer ends the studs 42$^c$ are threaded for the reception of clamping nuts 42$^e$. The studs pass through suitable holes formed in the inner cheek element 14 and the conical reinforcing plates 20 are provided with suitable apertures axially aligned with the studs so as to give access for assembling and disassembling the parts. The outer face plate 44$^a$ is provided with similar studs 44$^c$ secured by welded seams 44$^d$, the studs carrying clamping nuts 44$^e$ for securely anchoring the cushions or sandwiches 44 to the outer cheek plate 14$^a$. The conical reinforcing plate 20$^a$ is apertured so as to give access to the nut 44$^e$.

As shown in Figure 3, one of the inner face plates, the plate 42$^b$ in the case illustrated, has a stud 46 secured thereto by a welded seam 48. This stud passes laterally through a hole 50 formed in the web 40, and also passes through a hole 52 formed in the face plate 44$^b$. At its outer end the stud 46 is threaded to receive a clamping nut 54 by which means the inner face plates 42$^b$ and 44$^b$ are securely clamped to the wheel web 40. The cushion 44 is apertured at 56 and similar apertures aligned with that shown at 56 are formed in the outer face plate 44$^a$, the outer cheek element 14$^a$ and the outer conical reinforcing plate 20$^a$, so as to permit a socket wrench to be engaged with the nut 54 to facilitate assembling or dismantling of the parts.

The described construction provides for the quick assembly of the rubber sandwiches and incorporation of them in the wheel structure without the necessity of employing welding apparatus. In other words, the sandwich connections can be made by means of simple mechanical tools such as socket wrenches or the like. This is advantageous when maintenance crews in isolated localities not having welding equipment are required to make repairs or installations of the cushions.

While I have described quite specifically a construction which an actual reduction to practice has demonstrated is quite desirable to meet certain operating conditions, it is not to be construed that I am limited thereto since various modifications and substitutions of equivalents may be made by those skilled in the art without departure from the invention as defined in the appended claims.

I claim:

1. A resilient car wheel comprising an annular rim, an annular web integral with said rim and extending inwardly intermediate the width thereof and being open at the center, a hub loosely received within the open center of said web, annular inner and outer cheek plates carried by said hub on opposite sides of said web and being spaced therefrom, annular resilient cushions disposed in the spaces between said web and said cheek plates and having metallic face plates bonded to their inner and outer faces adjacent said web and said cheek plates, a plurality of uniformly spaced stud bolts affixed to each of the two face plates which are adjacent said cheek plates, said stud bolts forming circular patterns centered about the wheel axis and extending through the adjacent cheek plates, a plurality of uniformly spaced stud bolts affixed to one of the two face plates which are adjacent said web, said second named stud bolts forming a circular pattern centered about the wheel axis intermediate said first named stud bolts and extending through said web and the other face plate adjacent thereto, the opposite cheek plate, face plate and cushion having enlarged apertures opposite said second named stud bolts, and nuts threadedly engaged with said first and second named stud bolts.

2. A resilient car wheel comprising an annular rim, an annular web integral with said rim and extending inwardly intermediate the width thereof and being open at the center, a hub loosely received within the open center of said web, annular inner and outer cheek plates carried by said hub on opposite sides of said web and being spaced therefrom, annular resilient cushions disposed in the spaces between said web and said cheek plates and having metallic face plates bonded to their inner and outer faces adjacent said web and said cheek plates, a plurality of uniformly spaced stud bolts affixed to each of the two face plates which are adjacent said cheek plates, said stud bolts forming circular patterns centered about the wheel axis and extending through the adjacent cheek plates, a plurality of uniformly spaced stud bolts fixed to each of the two face plates which are adjacent said web, said second named stud bolts forming circular patterns centered about the wheel axis intermediate said first named stud bolts and extending through said web and the other face plate adjacent thereto, the opposite cheek plates, face plates and cushions having enlarged apertures opposite said second named stud bolts, and nuts threadedly engaged with said first and second named stud bolts.

ARTHUR R. SCHULZE.

REFERENCES CITED

The following references are of record in the file of this patent:

UNITED STATES PATENTS

| Number | Name | Date |
|---|---|---|
| 2,124,350 | Hirshfeld | July 19, 1938 |
| 2,277,835 | Alben | Mar. 31, 1942 |
| 2,404,581 | Workman | July 23, 1946 |

FOREIGN PATENTS

| Number | Country | Date |
|---|---|---|
| 203,508 | Switzerland | June 16, 1939 |